April 27, 1971     E. VALLET ET AL     3,576,765
PROCESSES FOR PREPARING MIXED SULPHIDES, SOLID SOLUTIONS
OF SIMPLE AND MIXED SULPHIDES OF TRANSITION METALS AND
METALLIC OXYSULPHIDES, AND NEW COMPOUNDS OF THIS TYPE
Filed June 13, 1966

INVENTORS
E. VALLET ET AL
BY *William W. Stoker*
ATTORNEY

United States Patent Office 3,576,765
Patented Apr. 27, 1971

3,576,765
PROCESSES FOR PREPARING MIXED SULPHIDES, SOLID SOLUTIONS OF SIMPLE AND MIXED SULPHIDES OF TRANSITION METALS AND METALLIC OXYSULPHIDES, AND NEW COMPOUNDS OF THIS TYPE
Etienne Vallet, Jacques Maurice Pâris, and René Antoine Pâris, Lyon, France, assignors to Centre National de la Recherche Scientifique, Paris, France
Filed June 13, 1966, Ser. No. 557,047
Claims priority, application France, June 14, 1965, 20,659; July 27, 1965, 26,194; June 10, 1966, 65,075
Int. Cl. B01j 11/74
U.S. Cl. 252—439
10 Claims

ABSTRACT OF THE DISCLOSURE

The invention relates to a process for preparing sulphurated products containing at least two metals and which is selected from the group consisting of thiochromites, thiovanadites and thiotitanates of mono- and divalent metals, of solid solutions of simple and mixed sulphides of transition metals and metallic oxisulphides, which comprises heating progressively thermically decomposable compositions containing the metallic atoms under the same ratio as in the end products in an hydrogen sulphide containing atmosphere, to a predetermined temperature ranging from 200 to 1000° C. and maintaining the heated product at said predetermined temperature until the content in oxygen, if any, of the heated product has become substantially constant.

---

Figure 1:
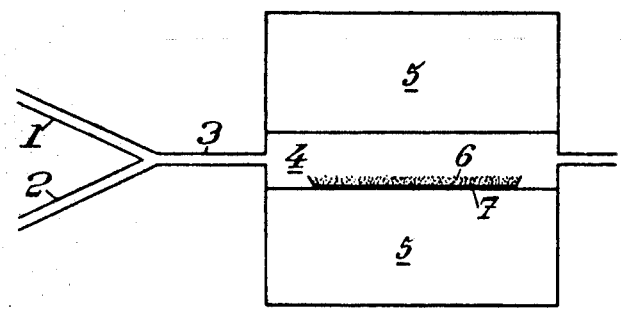

The invention relates to the processes for preparing mixed sulphides, such as thiocromites, thiovanadites and thiotitanates of monovalent and divalent metals, solid solutions of simple and mixed sulphides of transition metals and metallic oxysulphides and it pertains also to new compounds of such type obtained in particular by the performance of the processes improved according to the invention.

A certain number of these mixed sulphides and of these solid solutions of sulphides, has already been prepared by carrying out lengthy and difficult processes.

According to a first type of process directed more particularly to the preparation of thiochromites, thiovanadites and thiotitanates of mono- and divalent metals, it has already been proposed to react directly mixtures of sulphur and of the elements (or the salts of these elements) which are supposed to be found in the final desired product.

For instance, one has prepared thiovanadites by heating intimate mixtures of the constituents of the desired thiovanadite, for instance: vanadium+metal+sulphur, at temperatures of about 800° C. (M. Chevreton, A. Sapet, Comptes Rendus de l'Académie des Sciences de Paris 261 (1965), p. 928).

In the same manner, one has also prepared thiochromites of alkali metals, such as sodium, by heating under temperatures ranging between 800° C. and 900° C. a mixture of sulphur, of potassium chromate and of sodium carbonate to obtain the thiochromite $NaCrS_2$, or such as potassium by heating a mixture of potassium thiocyanate (KSCN) and of chromium oxide ($Cr_2O_3$) to obtain the thiochromite $KCrS_2$.

This last technique is not important from an industrial standpoint, since it requires a large excess of sulphur and of sulphurated compounds (with a ratio of $KSCN/Cr_2O_3$ of about 30 to 50) most part of which is destroyed during the reaction (with evolvement of $SO_2$). Further, the molten reaction mixture must be afterwards subjected to a scrubbing with slightly alkaline liquors in order to finally isolate the pure thiochromite.

Such type of process is however burdened with numerous drawbacks. It is difficult to achieve complete reaction. Further, for instance in the case of the use of metals like vanadium, the walls of the reaction vessel must be protected against their corrosive action. For instance, when the vessel is made of a tube of silica, the latter must be protected by a film of carbon.

According to a second type of process, used more often to prepare mixed sulphides or solid solutions of sulphides, the simple sulphides are reacted in the proportions appropriate to each case.

For instance, one has prepared the barium thiotitanate, $BaTiS_3$, by heating at 600° C. during 14 days a mixture of barium sulphide, BaS, and of titanium sulphide, $TiS_2$, in molar proportions (M. Hahn, U. Muhschke—Zeitschrift für Anorganische und Allgemeine Chemie, 288 (1956), p. 269).

According to a similar procedure, metallic thiochromites have been prepared by heating for a prolongated period of time under an inert atmosphere and at temperatures of about 1000° C., intimate mixtures of the sulphide $Cr_2S_3$ and of a sulphide having the formulas $M_2S$ or MS wherein M represents a metal either monovalent or divalent.

The same type of process has been used for preparing solid solutions of $ZnCr_2S_4$ and $CdCr_2S_4$ by subjecting intimate mixtures of the simple sulphides ZnS, CdS and $Cr_2S_3$ to heating sequences under temperatures of 700° C., 900° C. and 1000° C. respectively, each time for a period of 12 hours (G. Lapluye, L. Abello, Bull. Soc. Chim. Fr. 1963, 1062–66).

All these processes however are difficult to carry out owing to the difficulties of reacting relatively unreactive solids.

The solids must be brought previously to a finely divided state and, even during the reaction procedure, be resubjected to crushing and homogenizing procedures between heating sequences.

Further, the thermal instability of certain metallic sulphides limits the temperature under which the reaction can be performed. In these conditions, the reaction speed is very low, if not zero. For instance in the case of mixed sulphides starting from sulphides mixtures containing $TiS_2$, the temperature cannot be raised above 600° C., in order to avoid its decomposition. It has been proposed to overcome partially such drawbacks by operating at a slightly increased temperature in the presence of an excess of sulphur which must be removed subsequently. For instance disulphides of cobalt $CoS_2$ and of nickel $NiS_2$ have been syncrystallized according to this last alternative by heating at temperatures not lower than 700° C. during 24 hours (D. Delafosse, Hoang Van Can, Comptes Rendus Académie Sciences Paris, 254 (1962), pp. 1286–88); if the same reaction is performed in the absence of an excess of sulphur, a polyphased produced is obtained which is constituted by a mixture of the two solid solutions (Co, Ni)$S_2$ and (Co, Ni)$_3S_4$.

The object of the invention is to provide an improved process for preparing pure, monophaseous, mixed sulphides by increasing the reactivity of the reactants at the time of the reaction.

Another object of the invention is to substantially decrease the time of reaction.

A further object of the invention is to provide a process which is fully operable at sufficiently low temperatures, such as to enable the preparation of mixed sulphides or of solid solutions of sulphides, the simple sulphide components of which are unstable under high temperatures, and more generally, the object of the invention is to provide a process leading to a great number of mixed sulphides and of solid solutions of simple or mixed sulphides or oxysulphides.

The other objects of the invention will appear as a description of the invention and of non-limitative examples thereof proceeds.

The process according to the invention for preparing mixed sulphides such as thiochromites, thiovanadites and thiotitanates of mono- and divalent metals and of solid solutions of simple and mixed sulphides of transition metals and of metallic oxysulphides, comprises, in a first step: heating progressively in a sulphurizing atmosphere of hydrogen sulphide, containing, if the case should be, hydrogen and an inert gas, such as argon, to a predetermined temperature ranging from 200 to 1000° C., compositions constituted either by thermically decomposable mixed compounds, in particular mixed salts, or intimate mixtures of thermically decomposable simple or complex compounds, in particular simple or mixed salts, containing the metallic atoms corresponding to those to be contained in the final product in the same molar proportions and, In a second step: maintaining the heated products in the above sulphurizating atmosphere until the products are substantially free from oxygen in the case of the mixed sulphides and solid solutions of sulphides or until the ratio of the oxygen to sulphur has become substantially constant in the case of solid solutions of oxysulphides.

The invention consists also in new products, in particular the mixed compounds constituted by the lithium thiochromite, the sodium and manganese thiovanadites and the calcium thiotitanate, the solid solutions of sulphides having the following formulas:

$(Z_xZ'_{1-x})S_{1+\epsilon}$, where Z and Z'=Cr, Ti, V; Z and Z' being different. $0<x<1$; $0<\epsilon<0.15$
$(Th_xU_{1-x})OS$, where $0<x<1$
$(Fe_xNi_yCo_z)S$, where $x+y+z=1$
$(Cr_xTi_yV_z)S_{1+\epsilon}$, where $x+y+z=1$ and $0<\epsilon<0.15$ The invention is also concerned with the other mixed sulphides and solid solutions which can be obtained in a far more divided form namely under the form of submicronic crystals, than was presently obtainable through the known processes.

Concerning, more particularly, the compounds obtained it is known that the sulphides of chromium, vanadium and titanium are likely to give with the sulphides of a great number of mono- and divalent metals, mixed sulphides containing a sulphide of chromium, vanadium or titanium and the sulphide of an other metal in a molar constant proportion (generally 1/1).

These mixed sulphides can be represented by the following formulas:

$ATiS_3$, wherein A is a bivalent metal such as Ca, Ba, Sr;
$QVS_2$ wherein Q is a monovalent metal such as Li, Na, K;
$GV_2S_4$, wherein G is a bivalent metal such as Zn, Cd, Hg, Mn, Fe, Ni, Co, Cu.

In the same manner, the thiochromites can be represented by the following formulas:

$DCrS_2$, wherein D is a monovalent metal such as Li, Na, K, Ag
$JCr_2S_4$, wherein J is a bivalent metal such as Zn, Cd, Hg, Mn, Fe, Ni, Co.

Though all these formulas can be written under a dualistic form, bringing into evidence the molar ratio of 1/1 which exists between the titanium, vanadium or chromium sulphides and the above other metal sulphides:

$ATiS_3$ corresponding to $AS-TiS_2$;
$QVS_2$ corresponding to $\frac{1}{2}(Q_2S-V_2S_3)$;
$GV_2S_4$ corresponding to $QS-V_2S_3$;
$DCrS_2$ corresponding to $\frac{1}{2}(D_2S-Cr_2S_3)$; and
$JCr_2S_4$ corresponding to $JS-Cr_2S_3$.

It must be noted that the mixed sulphides possess an individuality which can be quite different from those of the simple sulphides from which they seem to originate when considering the above dualistic formulations.

As a matter of fact, the mixed sulphides, such as $GV_2S_4$, are characterized by a far more strict stoichiometry than the corresponding simple sulphides from which they seem to originate (GS and $V_2S_3$) the phases of which, though remaining homogeneous, may depart from the stiochiometric composition in relatively broad ranges. Further these mixed sulphides crystallize often in well defined and characteristic crystalline systems which are substantially different from those of the simple sulphides. For instance, the thiotitanates of the $ATiS_3$ type exhibit a rhomboidal symmetry analogous to that of $BaNiO_3$; the thiovanadites of the $GV_2S_4$ type exhibit monoclinic structures deriving from those of NiAs and analogous to those of $V_3S_4$; the thiochromites of the $JCr_2S_4$ type exhibit in some instances, a cubic symmetry with centered faces of the same type as the spinelles and in the other instances monoclinic structures. It must be noted that analogous structures were encountered for the new thiovanadites, thiotitanates and thiochromites of the invention having corresponding formulas and prepared for the first time according to the process of the invention.

This is principally the case with the calcium thiotitanate, $CaTiS_3$, the manganese thiovanadite $MnV_2S_4$ or the lithium thiochromite $LiCrS_2$;

Concerning the compositions of the solid solutions of the metallic sulphides considered in the present invention, they can be represented by the following formulas:

Binary solid solutions of simple sulphides:

$(L_xL'_{1-x})S$, wherein L and L'=Fe, Ni, Co and L≠L' with $0<x<1$.
$(L_xL'_{1-x})S_2$, idem
$(Z_xZ'_{1-x})S_{1+\epsilon}$, wherein Z or Z'=Cr, Ti, V and Z≠Z' $0<x<1$; $0<\epsilon<0.15$.

Ternary solid solutions of simple sulphides $(L_xL'_yL''_z)S$, wherein L or L' or L''=Fe, Ni Co; L≠L'≠L'''; $x+y+z=1$
$(Z_xZ'_yZ''_z)S_{1+\epsilon}$, wherein Z and Z' or Z''=Cr, Ti, V and Z≠Z'≠Z''; $x+y+z=1$; $0<\epsilon<0.15$.

Binary solid solutions of mixed sulphides:

$(R_xR'_{1-x})Cr_2S_4$, wherein R or R'=Zn, Mn, Cd, Hg, Co; R≠R'; $0<x<1$.

Binary solid solutions of simple oxysulphides:

$(Z_xZ'_{1-x})OS$, wherein Z or Z'=Th, U; Z≠Z'; $0<x<1$.

The simple and mixed sulphides and the oxysulphides of certain transition metals exhibit similar crystalline structures. Most of the simple sulphides and oxysulphides contemplated in the present invention exhibit a hexagonal organization of the big sulphur atoms (simple sulphides) and of oxygen atoms (oxysulphides) in the octahedral gaps of this organization.

In the case envisaged of mixed sulphides, the sulphur atoms are distributed on the knots of a cubic lattice with centered faces, the metallic atoms being located within the octahedral and tetrahedral gaps. Further, the composition of certain simple sulphides, in particular those of chromium, titanium and vanadium, may vary within certain limits, the phase concerned nevertheless keeping its crystalline individuality.

Owing to their similar structures, most of the above different metallic sulphides are completely miscible in the solid state. with the exception of the solid solutions of simple sulphides of the type $(Z_xZ'_{1-x})S_{1+\epsilon}$, wherein the proportion of titanium cannot become greater than 50% of the metallic atoms).

For instance, two thiochromites, such as $RCr_2S_4R'Cr_2S_4$ (in which R and R' are different and are constituted by Zn, Mn, Cd, Hg or Co) crystallize in the cubic system with centered faces of the spinelle type and are defined respectively by the sizes $a$ and $a'$ of the edges of the cubic meshes of their lattices. Through syncrystallization of these mixed sulphides, series of solid solutions $$(R_xR'_{1-x})Cr_2S_4$$

can be obtained with a cubic structure with centered faces, the size $a''_{-x}$ of the edge of the meshes of their lattices (with $x$ varying between 0 and 1) ranging within the interval of values limited by $a$ and $a'$.

Hence these series of solid solutions behave like well defined individual compounds exhibiting structure characteristics intermediate between those of the metallic sulphides from which they originate and cannot be considered as a mixture of two sulphides, in any instance whatsoever.

It must be noted that a certain number of new products has been prepared by carrying out the process according to the invention. Such solid solutions are of the type:

Binary solutions:

$(Z_xZ'_{1-x})S_{1+\epsilon}$, with Z or Z'=Cr, Ti, V; and Z≠Z'; $0<x<1$; $0<\epsilon<0.15$.

$(Z_xZ'_{1-x})OS$, with Z or Z'=Th and U; $0<x<1$.

Ternary solutions:

$(L_xL'_yL''_z)S$, with L or L' or L''=Fe, Ni, Co; L≠L'≠L''; $x+y+z=1$.

$(Z_xZ'_yZ''_z)S_{1+\epsilon}$, with Z or Z' or Z''=Cr, Ti, V and Z≠Z'≠Z''; $x+y+z=1$, $0<\epsilon<0.15$.

The process according to the present invention for preparing thiochromites of Li, Na, K, Ag, Zu, Cd, Hg, Mn, Fe, Ni, Co; thiovanadites of Li, Na, K, Zu, Cd, Hg, Mn, Fe, Co, Ni, Cu; thiotitanates of Ca, Ba, Sr; and solid solutions of the simple sulphides of transition metals such as Fe, Ni, Co, V, Cr, Ti, of mixed sulphides such as the thiochromites of bivalent metals, such as Cd, Mn, Hg and Co and of the oxysulphides of metals, such as U and Th, comprises, in a first step:

Heating progressively in a sulphurizating atmosphere of hydrogen sulphide, containing, if the case should be, hydrogen and an inert gas, such as argon, to a predetermined temperature ranging from 200 to 1000° C., compositions constituted either by thermically decomposable mixed compounds, in mixed salts, or intimate mixtures of thermically decomposable simple or complex compounds in particular simple or mixed salts, containing the metallic atoms corresponding to those to be contained in the final product in the same molar proportions and, In a second step: maintaining the heated products in the above sulphurizating atmosphere until the products are substantially free from oxygen in the case of the mixed sulphides and solid solutions of sulphide or until the ratio of the oxygen to sulphur has become substantially constant in the case of solid solutions of oxysulphides.

Concerning the above first progressive heating step of the starting mixed compounds or mixtures of mixed compounds in the process of the invention, the temperature is advantageously increased, starting from 50° C. until the determined final temperature, between 200 and 1000° C., at a rate of about 200° C. per hour. It must be observed that the decomposition of the starting compositions and a partial sulphurization occur practically in a simultaneous manner already during this first step. The sulphurization is completed during the second step which must follow immediately the first step in the same sulphurizating atmosphere.

This contacting of the starting composition with the sulphurizing atmosphere from the very beginning of the heating, is absolutely essential for the obtaining of well sulphurated products in a relatively short period of time. In the case where the sulphurizing atmosphere would be brought in contact with the already heated and thermically decomposed compositions, the replacement of the oxygen by sulphur in the mixed oxides (chromites, vanadites or titanates) or in the mixtures of mixed oxides resulting from such decomposition would become extremely difficult since the sulphurization would occur on phases which were already formed and which are the less reactive when the better crystallized, in particular when they originate from a thermolysis of the mixed salts at temperatures superior to 500° C.

It can be noted that the preparation of a metallic thiochromite starting from a mixed oxide containing chromium (chromite) at temperatures of about 500° C. under the action of hydrogen sulphides, requires several days.

The end of the second step can be determined through either a spectral (when the mixed sulphides or the solid solutions obtained exhibit a sufficient crystalline organization) or a chemical analysis.

In the case of spectral analysis, the Debye and Scherrer X-ray spectra exhibits only one system of diffraction rays. It can be observed that the rays are located in positions intermediate between those which would be given by the two simple or mixed sulphides entering into the solid solutions.

In the case of chemical analysis contents of the different metals and of the sulphur in the residue are dosed. In the case of the mixed sulphides or of their solid solutions, the sum of the contents of the above elements will reach 99 or 100% of the total weight of the residue when the sulphurization is complete. If this sum is inferior to 99% there remains atoms of oxygen in the products and the sulphurization must be considered as being not complete.

Actually, the chemical analysis will be preferred in many instances to the spectral analysis due to the fact that spectral analysis will not permit detecting minor amounts, say less than 5%, of a wholly disorganized phase which could remain present in the residue and which could be constituted by mixed oxides which have not reacted with the hydrogen sulphide.

In the case of solid solutions of the oxysulphides, the reaction is ended when the ratio of sulphur to oxygen (in general 1/1) has become constant. In most instances the second step lasts less than 5 hours.

Preferred though non-limitative methods for preparing the different mixed sulphides and solid solutions of simple or mixed sulphides and of the oxysulphides will be found below.

(a) Preparation of thiochromites of Li, Na, K, Ag, Zn, Cd, Hg, Mn, Fe, Ni, Co

They are obtained by heating in the two steps process according to the invention to and then at a temperature ranging from 200° to 900° C., preferably from 300° to 800° C. in a stream of hydrogen sulphide in admixture, if the case should be, with hydrogen, the following organic or mineral salts containing in their composition atoms of chromium and of the mono- or divalent metal in the proportion which exists in the final thiochromites obtained;

Concerning the organic metallic salts (1) $D(NH_4)_2[Cr(C_2O_4)_3]nH_2O$, in which D=Li+, Na+, K+

(2) $(NH_4)_3[M_{0.33}Cr_{0.67}(C_2O_4)_3]nH_2O$, in which $$M=Fe^{3+}, Co^{3+}$$

(3) $QB[(Z)_2Cr(C_2O_4)_2]nH_2O$, in which
Q=Li+, Na+, K+, Ag+
Z=($H_2O$, $NH_3$, pyridine), (ethylenediamine and aniline).

(4) $J[(Z)_2Cr(C_2O_4)_2]_2nH_2O$, in which
J=$Zn^{2+}$, $Cd^{2+}$, $Hg^{2+}$, $Co^{2+}$, $Ni^{2+}$
Z=($H_2O$, $NH_3$, pyridine, ethylenediamine or aniline).
$n$ ranging from 2 to 10.

Concerning the mineral salts, bichromates or chromates of metallic ions either alone or in the form of complex metallic ions, such as:

(5) $D_2Cr_2O_7$, $nH_2O$ in which D=Li+, Na+, K+; n=0(K); n=2(Li, Na).

(6) [J(Z)$_m$]Cr$_2$O$_7$, $n$H$_2$O, in which
   J=Zn$^{2+}$, Cd$^{2+}$, Hg$^{2+}$, Mn$^{2+}$, Co$^{2+}$, Ni$^{2+}$
   Z=NH$_3$, C$_5$H$_5$N, ethylenediamine, aniline
   $m$=2, 3, 4, or 6,
   $n$=0 in most instances
(7) [Ag$_2$(Z)$_m$]Cr$_2$O$_7$, $n$H$_2$O, in which
   Z=pyridine
   $m$=2, 3, 4 or 6 in most instances
(8) NH$_4$Fe(CrO$_4$)$_2$; (NH$_4$)$_2$Ni(CrO$_4$)$_2$6H$_2$O (b) Preparation of thiovanadites of Li, Na, K, Zn, Cd, Hg, Mn, Fe, Co, Ni, Cu and thiotitanates of Ca, Ba, Sr They are obtained by heating in the conditions of the above two-step process to and at a temperature ranging from 300° to 800° C. preferably from 400° to 700° C. in a stream of a hydrogen sulphide in a mixture, if the case should be, with hydrogen, the following organic or mineral salts containing in their composition atoms of titanium or vanadium and atoms of one of the mono- or divalent metals contemplated under (b) hereabove in the proportion which exists in the final thiotitanate or thiovanadite obtained;

(1) A[TiO(C$_2$O$_4$)$_2$]2H$_2$O, in which A=Ca$^{2+}$, Ba$^{2+}$, Sr$^{2+}$
(2) (NH$_4$)$_3$[Fe$_{0.33}$V$_{0.66}$(C$_2$O$_4$)$_3$]3H$_2$O
(3) QNH$_4$[VO(C$_2$O$_4$)$_2$]2H$_2$O, in which Q=Li$^+$, Na$^+$, K$^+$
(4) QVO$_3$, in which Q=Li$^+$, Na$^+$, K$^+$
(5) G(Z)$_m$(VO$_3$)$_2$, in which
   G=Zn$^{2+}$, Cd$^{2+}$, Hg$^{2+}$, Mn$^{2+}$, Co$^{2+}$, Ni$^{2+}$, Cu$^{2+}$
   Z=NH$_3$, C$_5$H$_5$N, ethylenediamine, aniline
   $m$=1, 2, 4, 6.

(c) Preparation of solid solutions of simple sulphides of divalent metals such as Fe, Ni, Co One reacts with pure and anhydrous hydrogen sulphide to and at a temperature from 200° to 500° C., preferably from 250° to 450° C. the following mixed homogeneous compositions containing atoms of iron, nickel or cobalt, in a same ratio as the one desired in the final solid solutions and which can be represented by the solid solutions of:

oxalates: M$_x$M'$_{1-x}$(C$_2$O$_4$)$m$H$_2$O
sulphates: M$_x$M'$_{1-x}$SO$_4$, $n$H$_2$O
chlorides: M$_x$M'$_{1-x}$Cl$_2$, $p$H$_2$O in which M≠M'; 0<$x$<1, and, generally, $m$=2, $n$=6 or 1, and $p$=6; M and M'=Fe$^{2+}$, Na$^{2+}$, Co$^{2+}$.

(d) Preparation of solid solutions of titanium, vanadium and chromium sulphides

One reacts with hydrogen sulphide containing, if the case should be, hydrogen to and at temperatures not higher than 1000° C., the mixtures of the following oxalates:

(NH$_4$)$_3$[R(C$_2$O$_4$)$_3$]$n$H$_2$O, where R=V$^{3+}$, Cr$^{3+}$
(NH$_4$)$_2$[TO(C$_2$O$_4$)$_2$]$n$H$_2$O, where T=Ti$^{4+}$, V$^{4+}$ or the mixed salts obtained by syncrystallization and of the type (NH$_4$)$_3$[R$_y$R'$_{1-y}$(C$_2$O$_4$)$_3$]$n$H$_2$O, where R and R'=Cr$^{3+}$, V$^{3+}$; $o$<$y$<1
(NH$_4$)$_2$[(T$_z$T'$_{1-z}$)O(C$_2$O$_4$)$_2$]$n$H$_2$O, where T and T'=Ti$^{4+}$, V$^{4+}$; 0<$z$<1

(e) Preparation of solid solutions of mixed sulphides, such a thiochromites having the following general formula:

(E$_v$E'$_{1-v}$)Cr$_2$S$_4$, where E and E' are selected from Mn$^{2+}$, Zn$^{2+}$, Cd$^{2+}$, Hg$^{2+}$, Co$^{2+}$ One reacts with hydrogen sulphide containing, if the case should be, hydrogen to and at a temperature ranging from 200° to 500° C. preferably from 350° to 400° C., mixed compounds constituted by coprecipitates of the complex bicromates having the following formula:

[E$_v$E'$_{1-v}$(Z)$_m$]Cr$_2$O$_7$, where:
   E or E'=Mn$^{2+}$, Cd$^{2+}$, Zn$^{2+}$, Hg$^{2+}$, Co$^{2+}$; 0<$v$<1
   Z=NH$_3$, pyridine, ethylenediamine, aniline
   $m$=2, 3, 4 or 6

The second step of the process according to the invention is caried out for a period less than 10 hours.

(f) Preparation of solid solutions of oxysulphides of uranium and thorium

One reacts with pure and dry hydrogen sulphide in admixture, if the case should be, with hydrogen, a mixed oxalate of thorium (IV) and uranium (IV) obtained by coprecipitation and having the formula:

$$U_xTh_{1-x}(C_2O_4)_26H_2O$$

(A. Badard, J. M. Paris, Comptes-Rendus Acad. Sci. Fr. 257 (1963), 3421-3).

The sulphurization is complete between 800° and 1000° C. after about five hours heating.

Figure 2:
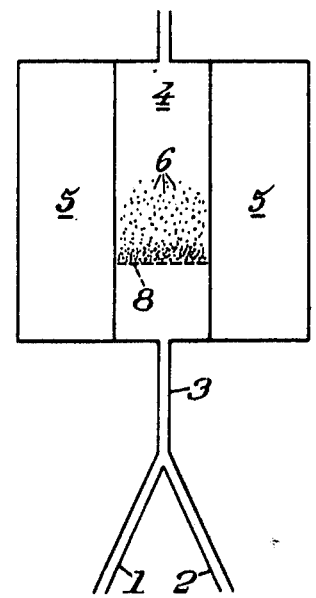

FIGS. 1 and 2 show diagrammatically apparatuses which may be used efficiently for carrying out the process according to the invention.

In the apparatus represented by FIG. 1 the starting composition is subjected to a licking by a gaseous sulphurating mixture. Such apparatus permits the treatment of small amount of products.

In FIG. 2 there is represented diagrammatically, an apparatus in which the gaseous sulphurating mixture passes through the entire mass of the starting products; this apparatus may be contrived under two alternatives, one of which permits the treatment of the starting material according to the principle of the fixed bed, and the other one, according to the principle of the fluidized bed.

In both instances, the hydrogen sulphide and the hydrogen arrive respectively through a duct 1 and a duct 2 joining together into a single duct 3 which supplies the gaseous mixture within the vessel 4 provided with a heating element 5.

In FIG. 1 the vessel 4 is arranged horizontally, the product 6 being spread into a thin layer in the vessel 7 whereas, in FIG. 2, it is contained in the vessel so as to permit its treatment either in a fixed or in a fluidized bed above a grid 8. This last technique enables the treatment of greater amounts of products in shorter periods of time than with the apparatus shown in FIG. 1 due to the fact that it enables a better contact between the reactants.

The products obtained according to the process of the invention are characterized, when they are prepared at a temperature not higher than 500° C., by the extreme fineness of their particles which confers to these particles a great chemical reactivity. In particularly these products can dissolve far more easily in acid solutions than the products obtained heretofore by the known processes. It has been seen above that the powders of mixed sulphides obtained in the present process are generally constituted by submicronic crystals in particular when they result from a thermal treatment at temperatures not higher than 500° C. (however it must be noted that the determination of the size of the crystals which is made, starting from the Debye and Scherrer X-ray diagrams is only an approximation due to the great broadness of the diffraction rays).

Further, the size of the crystals can be increased in a controlled manner by subjecting the product obtained at low temperature (generally less than 500° C.) to a further heating step in an inert atmosphere at a temperature between the range of 500° and 800° C. It has been observed, for instance, in the case of the zinc thiochromite ZnCrS$_4$ obtained at a temperature of 400° C. (duration of the above second step: 4 hours) constituted by submicronic particles that a further heating of said thiochromite at 800° C. during 20 hours, led to a spectra with narrow and intense picks. In order to further illustrate the invention, there will be described below a certain number of examples of the performance of the process according to the invention, such examples having, of course, no limitative character.

EXAMPLE 1

The lithium thiochromite $LiCrS_2$ can be prepared starting from either an organic salt or from the lithium bichromate:

The organic salt $Li[(H_2O)_2Cr(C_2O_4)_2]$ is heated from 50° to 500° at a rate of 200° C. per hour under a stream of hydrogen sulphide (pure or diluted by hydrogen). An at least partial sulphurization occurs substantially simultaneously with the decomposition during the progressive increase of the temperature.

The sulphurization is completed after the temperature has been maintained at 500° for 3 hours.

The sulphurization residue is a lithium thiochromite $LiCrS_2$ in a finely divided form.

The above organic salts can be replaced by the salt $Li(NH_4)_2[Cr(C_2O_4)_3]$ obtained by the syncrystallization of the salts $Li_3[Cr(C_2O_4)_3]$ and $(NH_4)_3[Cr(C_2O_4)_3]$.

According to another procedure, the mineral salt $Li_2Cr_2O_7$, $2H_2O$ is heated from 50° to 600° C. at a rate of 200° C. per hour under a stream of hydrogen sulphide (6 liters per hour) and of hydrogen (18 liters per hour).

The sulphurization is completed by maintaining the products at the temperature of 600° C. for 3 hours.

EXAMPLE 2

The sodium thiochromite $NaCrS_2$ is prepared starting either from an organic salt or from the sodium bichromate:

The organic salt $Na[(H_2O)_2Cr(C_2O_4)_2]$, $3H_2O$ is heated from 50° to 500° C. at a rate of 200° C. per hour in a stream of hydrogen sulphide (pure or diluted with hydrogen).

The sodium thiochromite $NaCrS_2$ in a finely divided form is obtained after the heated products have been maintained at 500° C. for 3 hours. The mineral salt $Na_2Cr_2O_7$, $2H_2O$ is heated from 50° to 600° C. at a rate of 200° C. per hour in a current of $SH_2$ (6 l./h.) and $SH_2[SiC]$ (18 l./h.) and maintained for another 3 hours at 600° C. The residue is constituted by the thiochromite $NaCrS_2$ in the form of pure and divided particles.

The potassium thiochromite $KCrS_2$ can be prepared in an identical manner, either starting from $K[(H_2O)_2Cr(C_2O_4)_2]$ or from the potassium bichromate $K_2Cr_2O_7$ in the same manner as for the corresponding sodium salts.

EXAMPLE 3

The silver thiochromite $AgCrS_2$ is prepared starting either from an organic complex or from the bichromate:

The complex $Ag[Py_2Cr(C_2O_4)_2]$ (in which Py designates pyridine) is prepared by adding silver perchlorate to a suspension of $HPy[Py_2Cr(C_2O_4)_2]$, $2.5H_2O$ in water. The mixture is stirred for ten minutes and left to rest for a night; the precipitate is then separated by filtration and washed with absolute alcohol; its formula is $$Ag[Py_2Cr(C_2O_4)_2]$$

The same is heated from 50° to 600° C. at a rate of 200° C. per hour in a current of $SH_2$ (6 l./h.) mixed with hydrogen (18 l./h.) and maintained for 3 hours at 600° C. The finely divided black residue is constituted of the pure silver thiochromite $AgCrS_2$. The silver thiochromite can be obtained also starting from the biochromate $Ag_2(Py)_3Cr_2O_7$ treated in identical conditions.

EXAMPLE 4

The zinc thiochromite $ZnCrS_2$ is prepared starting either from an organic compound or from biochromate:

The organic salts of Zn having a formula $$Zn[(Py_2)Cr(C_2O_4)_2]_2$$

$7H_2O$ (Py=pyridine) are prepared by the action of zinc acetate on the salt $HPy[(Py)_2Cr(C_2O_4)_2]$, $2.5H_2O$, suspended in water. The precipitate obtained is filtered and washed in absolute alcohol. This organic complex is heated from 50° to 350° C. at a rate of 200° C. per hour in a stream of $SH_2$ (6 l./h.) and hydrogen (18 l./h.), the temperature being maintained for another 4 hours at 350° C. The finely crystallized residue is constituted of pure zinc thiochromite $ZnCr_2S_4$ of the spinelle type.

The same thiochromite is obtained by treating the biochromate $Zn(Py)_4Cr_2O_7$ in identical conditions.

The thiochromites of manganese, cadmium, mercury and cobalt which are all of the spinelle type, have been prepared starting from respectively:

$Mn[(Py)_2Cr(C_2O_4)_2]_2$, $8H_2O$ (itself obtained starting from manganese sulfate) or from $Mn(Py)_4Cr_2O_7$;

$Cd[(Py)_2Cr(C_2O_4)_2]_2$, $2H_2O$ (itself obtained starting from cadmium acetate or $Cd(Py)_4Cr_2O_7$);

$Hg[(Py)_2Cr(C_2O_4)_2]_2$, $6H_2O$ (itself obtained starting from mercuric chloride or $Hg(Py)_2Cr_2O_7$);

$Co[(Py)_2Cr(C_2O_4)_2]_2$, $6H_2O$ (itself obtained starting from cobalt nitrate or $Co(Py)_4Cr_2O_7$).

EXAMPLE 5

Preparation of the nickel thiochromite $NiCr_2S_4$; the organic starting salt $Ni[Py_2Cr(C_2O_4)_2]_2$, $9H_2O$ has been obtained by the same procedure as described in Example 4 for preparing $Zn[Py_2Cr(C_2O_4)_2]_2$, starting however from nickel nitrate.

This complex is heated to 400° C. in the same conditions as in Example 4 and maintained at this temperature for about 3 hours.

The nickel thiochromite $NiCr_2S_4$ is obtained as a pure residue finely crystallized in the monoclinic system.

In another experience, the same starting product was heated from 50° to 900° C. at a rate from 400° C. per hour and maintained at 900° C. for 3 hours. The residue is constituted of nickel thiochromite $NiCr_2S_4$ in a well crystallized form still having a monoclinic structure.

Identical results have been obtained when replacing $Ni[Py_2Cr(C_2O_4)_2]_2$, $9H_2O$ by the biochromate $$Ni(Py)_4Cr_2O_7$$

EXAMPLE 6

The ferrous thiochromite $FeCr_2S_4$ is prepared starting from the organic salt $(NH_4)_3[Fe_{0.33}Cr_{0.67}(C_2O_4)_3]$, $3H_2O$, which itself is obtained through syncrystallization of the salts $(NH_4)_3[Fe(C_2O_4)_3]$ and $(NH_4)_3[Cr(C_2O_4)_3]$ taken in the appropriate ratio.

The above starting salt is heated from 50° to 400° C. at a rate of 200° C. per hour in a stream of $SH_2$ (6 l./h.) diluted with hydrogen 18 l./h.), the decomposition products being then maintained in said stream at 400° C. for 4 hours.

The residue is constituted of pure finely crystallized iron thiochromate $FeCr_2S_4$ of the spinelle type.

The ferrous thiocromite can be obtained by subjecting the chromate of iron (III) and of ammonium $$NH_4Fe(CrO_4)_2$$

to the same treatment as hereabove.

EXAMPLE 7

In order to bring into evidence the particular reactivity of the products obtained according to the process of the invention with respect to the acids, 150 mg. of zinc thiochromite have been reacted for one hour with 30 ml. of nitric acid of 26° Baumé.

The solid residue constittued by the portion of the thiochromite which did not react, is removed by filtration on a sintered glass filter system, and the zinc which passed into the recovered filtrate was dosed to ascertain the reactivity of the thiochromite (expressed in the weight percentage of dissolved zinc). A zinc thiochromite $ZnCr_2S_4$, prepared at 325° C. with the process described in the present invention, showed a reactivity of 95.0%. When the (well crystallized) zinc thiochromite was prepared according to the known process consisting of heating a mixture of simple sulphides CdS, ZnS and $Cr_2S_3$ at 800° C., the reactivity of said thiochromite measured in the same conditions was of only 14.2%.

EXAMPLE 8

The barium thiotitanate $BaTiS_3$ is produced starting from the complex salt $Ba[TiO(C_2O_4)]2H_2O$ which itself was obtained by adding an aqueous solution of $BaCl_2$ to an aqueous solution of the complex $K_2[TiO(C_2O_4)_2]$; the white precipitate obtained was filtered, washed with water and dried with air.

The above titanyl-oxalate of barium is heated from 50 to 600° C. at 200° C. per hour rate under a stream of $SH_2$, and by maintaining the heated product in said stream for 5 hours at 600° C. Pure barium thiotitanate $BaTiS_3$ is obtained.

EXAMPLE 9

The lithium thiovanadite $LiVS_2$ is prepared starting from the organic complex $(NH_4)Li[VO(C_2O_4)_2]$, which itself is obtained to syncrystallizing the complexes $$(NH_4)_2[VO(C_2O_4)_2] \text{ and } Li_2[VO(C_2O_4)_2]$$

in the appropriate proportions. The product $$(NH_4)Li[VO(C_2O_4)_2]$$

obtained is treated in the same conditions as in the Example 8 to obtain pure lithium thiovanadite $LiVS_2$.

An identical result was obtained starting from the lithium metavanadate $LiVO_3$ instead of starting from $$(NH_4Li[VO(C_2O_4)_2]$$

EXAMPLE 10

Sodium thiovanadite $NaVS_2$ was obtained starting either from sodium metavanadate $NaVO_3$ from the organic complex $(NH_4)Na[VO(C_2O_4)_2]$ in the same conditions as in Example 8. The above vanadium-sodium complex is obtained by syncrystallizing the complex salts $(NH_4)_2[VO(C_2O_4)_2]$ and $Na_2[VO(C_2O_4)_2]$ in appropriate proportions.

EXAMPLE 11

The nickel thiovanadite $NiV_2S_4$ is prepared starting from the nickel-pyridine metavanadate $Ni(Py)_4(VO_3)_2$ in which Py designates pyridine. This compound is obtained by adding pyridine to an aqueous solution of nickel sulphate and of sodium metavanadate, thereby precipitating the nickel-pyridine-metavanadate which is separated by filtration, washed and dried in air. This last compound is heated in a stream of pure $SH_2$ at a rate of 200° C. per hour from 50° to 650° C. and maintained at this last temperature for 5 hours; the X-ray spectra of the residue indicates that it consists of pure nickel thiovanadite.

EXAMPLE 12

Manganese thiovanadite $MnV_2S_4$ is obtained starting from the compound $Mn(Py)(VO_3)_3$ which was obtained by adding pyridine to an aqueous solution of manganese sulfate and of sodium metavanadate, the precipitate obtained being then separated by filtration, washed and dried in air and subjected to the same treatment as in Example 11, thereby obtaining the new compound $MnV_2S_4$.

EXAMPLE 13

The solid binary solutions of chromium and titanium sulphides are prepared starting from a coprecipitate of the hydroxides of the metals. This coprecipitate is obtained by adding an excess of ammonia to a solution of chromium (III) sulphate and of titanium (IV) sulphate, the proportions of which are chosen in correspondence with the desired composition of the solid solution. The precipitate is filtered, washed and dried in a drying-oven at 120° C. The solid product obtained is comminuted into particles of very fine size and brought up to 1000° C. at a rate of 300° C. per hour in an atmosphere constituted by a stream of $SH_2$ (6 l./h. diluted by hydrogen (18 l./h., and maintained at 1000° C. for another 5 hours.

The supply of $SH_2$ is then stopped while the supply of hydrogen is maintained still at 1000° C. for about 15 hours. The residue obtained is constituted by a binary mixed phase of chromium and titanium sulphides, the formula of which is: $(Ti_{0.45}Cr_{0.55})S_{1.07}$.

EXAMPLE 14

Binary solid solutions of chromium and vanadium sulphides are obtained starting from the mixed oxalic complex $(NH_4)_3[Cr_xV_{1-x}(C_2O_4)_3]nH_2O$; the latter can be obtained very easily by syncrystallizing the simple and isomorphous complexes $(NH_4)_3[Cr(C_2O_4)_3]$, $3H_2O$ and $(NH_4)_3[V(C_2O_4)_3]$, $3H_2O$.

By choosing appropriate proportions of these two last salts, $x$ can be varied from zero to 1 in the mixed complex and this will permit the preparation of the solid solutions of the chromium and vanadium sulphides in the whole possible range of compositions.

The mixed complex is subjected to the same treatment that the hydroxide precipitate underwent in the other example.

When choosing, for instance, $x=0.46$, the treatment residue consists of a mixed binary phase of the sulphides of chromium and vanadium having the formula $$(Cr_{0.46}V_{0.54})S_{1.06}$$

EXAMPLE 15

The solid binary solutions of vanadium and titanium sulphides are obtained by subjecting the mixed salt $$(NH_4)_2[(V_xTi_{1-x})°(C_2O_4)_2]$$

$nH_2O$ to the same treatment as in the two preceding examples.

The above mixed salt is obtained by syncrystallizing isomorphous complexes $(NH_4)_2[VO(C_2O_4)_2]$, $2H_2O$ and $(NH_4)_2[TiO(C_2O_4)_2]$, $3.5H_2O$, in the proportions corresponding to the desired value of the ratio of the two metals in the final product. For instance, when $x$ is chosen and equals to 0.50, the binary solid solution $$(V_{0.50}Ti_{0.50})S_{1.10}$$

is obtained.

EXAMPLE 16

The ternary solid solutions of the sulphides of chromium, vanadium and titanium are obtained by evaporating to dryness a solution of the following complex oxalates $$(NH_4)_3[Cr(C_2O_4)_2], 3H_2O$$

$$(NH_3)_2[TiO(C_2O_4)_2], 3.5H_2O$$

$$(NH_4)_2[VO(C_2O_4)_2], 2H_2O$$

taken in appropriate amount, and by subjecting the mixture of oxalates obtained to an identical treatment as that of the Examples 13 to 15, thereby leading to the ternary solid solutions of the chromium-vanadium-titanium sulphides.

EXAMPLE 17

Binary solid solutions of sulphides of iron and cobalt are obtained starting from a coprecipitate of the oxalates of the same metals. Said coprecipitate is heated up to 400° C. within 1 hour in a stream of $SH_2$ (66 l./h.) and of hydrogen (18 l./h.), the heated product being then maintained for 7 hours at 400° C. For instance, a completely sulphurizated solution having the formula $$(Fe_{0.49}Co_{0.51})S_{1.00}$$

is obtained when starting from oxalates coprecipitates corresponding to the formula $(Fe_{0.49}Co_{0.51})C_2O_4$, $2H_2O$.

EXAMPLE 18

The coprecipitates of iron and cobalt oxalates contemplated in Example 17 may lead to binary solid solutions of the type $(Fe-Co)S_2$ when treated in the current of pure $SH_2$ and heated progressively at a rate of 60° C.

per hour up to 400° C. and maintained at this temperature for 17 hours. The coprecipitate of oxalates of Example 17 leads to a solid solution having the formula:

$(Fe_{0.49}Co_{0.51})S_2$

EXAMPLE 19

Binary solid solutions of the thorium and uranium oxysulphides (ThOS-UOS) are obtained by subjecting a coprecipitate of oxalates of uranium (IV) and of thorium (IV) to a heating in a current of $SH_2$ (6 l./h.) of an hydrogen (18 l./h.) up to a temperature of 1000° C. at a rate of 300° C. per hour, the temperature of 1000° C. being then maintained for 5 hours. The supply of $SH_2$ is then stopped while the temperature is maintained for another 15 hours in the presence of hydrogen only. The residue obtained is constituted by a solid solution of the thorium and uranium oxysulphides ThOS-UOS.

EXAMPLE 20

Solid solutions of the thiochromites $MnCr_2S_4$ and $ZnCr_2S_4$ are obtained starting from a coprecipitate of bichromates corresponding to the following formula:

$[(Mn_xZn_{1-x})(Py)_n]Cr_2O_7$ wherein Py is pyridine.

This coprecipitate is obtained by adding ammonium bichromate to a solution of zinc and manganese sulphates and by adding to the mixture, pyridine up to a concentration in this last compound of about 10%. The salt obtained is heated within 2 hours up to 500° C. in a stream of $SH_2$ (6 l./h.) and of hydrogen (18 l./h.), the heated product being then maintained in said current at 500° C. for 6 hours. The X-ray diagram of the residue shows that it consists of zinc and manganese thiochromites.

EXAMPLE 21

The mixed bichromate:

$[(Zn_xCd_{1-x})(Py)_n]Cr_2O_7$ is heated until 400° C. within 2 hours in a stream of $SH_2$ (6 l./h.). The sulphurization is complete at the end of the first heating step, as it is shown by the X-ray diagram which shows that the solid solutions of $ZnCr_2S_4$ and $CdCr_2S_4$ are obtained. The mixed sulphides and solid solutions of simple or mixed sulphides or of oxysulphides obtained according to the present invention are of great interest owing to their particular properties, to wit their reactivity, their specific surface, their amorphous or crystallized state, etc. These compositions find application in numerous fields, for instance, as:

(a) catalytic masses,
(b) products which can be used for producing materials having semi-conductive, magnetic, ferroelectric properties,
(c) refractory materials.

In a general manner, while we have, in the above description, disclosed what we deem to be practical and efficient embodiments of the invention, it should be well understood that we do not wish to be limited thereto as there might be changes made therein without departing from the principle of the present invention as comprehended within the scope of the appended claims.

What we claim is:

1. A process for preparing a sulphurated product containing at least two metals and which is selected from the group consisting of thiochromites, thiovanadites and thiotitanates of mono- and divalent metals, of solid solutions of simple and mixed sulphides of transition metals and thorium and uranium oxysulphides, said at least two metals being present in said product in a ratio under which said product is constituted by a single phase, which comprises in a first step, heating progressively in a sulphurizing atmosphere, the essential component of which is hydrogen sulphide, to a predetermined temperature in the range of from 200° C. to 1000° C., a thermally decomposable composition containing the metallic atoms in the same ratio, said heating progressively being by the raising of the temperature sufficiently slowly to permit substantially simultaneously the decomposition and sulphurization of the said thermically decomposable composition and, in a second step, maintaining the heated products in said sulphurizing atmosphere until the products are substantially free from oxygen in the case of the mixed sulphides and solid solutions of sulphides and until the ratio of the oxygen to sulphur has become substantially constant in the case of solid solutions of oxysulphides.

2. A process according to claim 1 wherein the progressive heating in said first step consists of heating said starting composition from a temperature of about 50° C. to said predetermined temperature at a rate in the range of 60° C. to 400° C. per hour.

3. A process according to claim 1 wherein said sulphurizing atmosphere contains also a gas selected from the group consisting of hydrogen, inert gases and mixtures thereof.

4. A process according to claim 1 for preparing thiochromites of a metal selected from the group consisting of Li, Na, K, Ag, Zn, Cd, Hg, Mn, Fe, Ni, and Co wherein said thermically decomposable composition is heated progressively in said first step up to a temperature in the range from 300° C. to 800° C. at a rate of about 200° C. to 400° C. per hour, and wherein said thermically decomposable compositions are selected from the group consisting of:

(1) $D(NH_4)_2[Cr(C_2O_4)_3]$ and hydrates thereof, in which $D=Li^+, Na^+,$ or $K^+$;
(2) $(NH_4)_3[M_{0.33}Cr_{0.67}(C_2O_4)_3]$ and hydrates thereof, in which $M=Fe^{3+}$, or $CO^{3+}$;
(3) $Q[(Z)_2 Cr(C_2O_4)_2]$ and hydrates thereof, in which $Q=Li^+, Na^+, K^+,$ or $Ag^+$; and $Z=H_2O, NH_3,$ pyridine, ethylenediamine, or aniline;
(4) $J[(Z)_2 Cr(C_2O_4)_2]_2 \cdot nH_2O$, in which
 $J=Zn^{2+}, Cd^{2+}, Hg^{2+}, Mn^{2+}, Co^{2+},$ or $Ni^{2+}$;
 $Z=H_2O, NH_3,$ pyridine, ethylenediamine or aniline; and $n$ is a number from 2 to 10 inclusive;
(5) $D_2Cr_2O_7 \cdot H_2O$ in which $D=Li^+, Na^+,$ or $K^+$; $n=0$ when D is K, $n=2$ when D is Li or Na;
(6) $[J(Z)_m] Cr_2O_7$, and hydrates thereof in which,
 $J=Zn^{2+}, Cd^{2+}, Hg^{2+}, Mn^{2+}, Co^{2+},$ or $Ni^{2+}$;
 $Z=NH_3, C_5H_5N,$ ethylenediamine, or aniline;
 $m=2, 3, 4,$ or 6;
(7) $[Ag_2(Z)_m] Cr_2O_7$, and hydrates thereof, in which $Z=$pyridine and $m$ is at least 1; and
(8) $NH_4FE(CrO_4)_2$; $(NH_4)_2 Ni(CrO_4)_2 \cdot 6H_2O$.

5. A process according to claim 1 for preparing thiovanadites selected from the group consisting of Li, Na, K, Zn, Cd, Hg, Mn, Fe, Co, Ni, and Cu and thiotitanates selected from the group consisting of Ca, Ba, and Sr, wherein said thermically decomposable composition is heated progressively in said first step up to a temperature ranging from 400° C. to 700° C. at a rate of about 200° C. per hour and wherein said thermically decomposable compositions are selected from the group consisting of:

(1) $A[TiO(C_2O_4)_2] \cdot 2 H_2O$, in which $A=Ca^{2+}, Ba^{2+},$ or $Sr^{2+}$;
(2) $(NH_4)_3 [Fe_{0.33} V_{0.67} (C_2O_4)_3] \cdot 3 H_2O$;
(3) $Q NH_4 [VO (C_2O_4)_2] \cdot 2 H_2O$, in which $Q=Li^+, Na^+,$ or $K^+$;
(4) $Q VO_3$, in which $Q=Li^+, Na^+,$ or $K^+$; and
(5) $G (Z)_m (VO_3)_2$ in which $G=Zn^{2+}, Cd^{2+}, Hg^{2+}, Mn^{2+}, Co^{2+}, Ni^{2+},$ or $Cu^{2+}$;
 $Z=NH_3, C_6H_5N,$ ethylenediamine, or aniline; and $m=1, 2, 4,$ or 6.

6. A process according to claim 1 for preparing binary solid solutions of simple sulphides of Fe, Ni, and Co of the type MM's, wherein M and M' are one of the metals selected from the group consisting of Fe, Ni, and Co wherein said thermally decomposable composition is heated progressively in said first step up to a temperature in the range of from 250° C. to 400° C. at a rate of about 400° C. per hour, and wherein said thermically decomposable compositions are selected from the group consisting of:

oxalates:
$M_xM'_{1-x}(C_2O_4)$ and hydrates thereof;
sulphates:
$M_xM'_{1-x}SO_4$ and hydrates thereof;
chlorides:
$M_xM'^1_{-x}Cl_2$ and hydrates thereof;
in which $M \neq M'$, $0<x<1$, and M and $M'= Fe^{2+}$, $N^{2+}$, or $Co^{2+}$.

7. A process according to claim 1 for preparing binary solid solutions of simple sulphides of Fe, Ni, and Co of the type $MM'S_2$, wherein M and M' are one of the metals selected from the group consisting of Fe, Ni, and Co, wherein said thermally decomposable composition is heated progressively in said first step to a temperature of 400° C. at a rate of 60° C. per hour, and wherein said thermically decomposable compositions are selected from the group consisting of:

oxalates:
$M_xM'_{1-x}(C_2O_4)$ and hydrates thereof;
sulphates:
$M_xM'_{1-x}SO_4$ and hydrates thereof;
chlorides:
$M_xM'_{1-x}Cl_2$, and hydrates thereof;
in which $M \neq M'$, $0<x<1$, and M and $M'= Fe^{2+}$, $Ni^{2+}$, or $Co^{2+}$.

8. A process according to claim 1 for preparing solid solutions of Ti, V, and Cr, wherein said thermically decomposable composition is heated progressively in said first step until a temperature of 1000° C. at a rate of 300° C. per hour, and wherein said thermically decomposable compositions are selected from the group of mixtures consisting of a mixture of
$(NH_4)_3[R(C_2O_4)_3]$ and hydrates thereof, where $R= V^{3+}$, or $Cr^{3+}$; and
$(NH_4)_2[TO(C_2O_4)_2]$ and hydrates thereof, where $T= Ti^{4+}$, or $V^{4+}$ and of a mixture of
$(NH_4)_3[R_yR'_{1-y}(C_2O_4)_3]$ and hydrates thereof, where R and $R'=Cr^{3+}$, or $V^{3+}$, $0<y<1$, and
$(NH_4)_2[T_zT'_{1-x})O(C_2O_4)_2]$ and hydrates thereof, where T and $T'=Ti^{4+}$, or $V^{4+}$, $0<z<1$.

9. A process according to claim 1 for preparing solid solutions of mixed sulphides, such as thiochromites or mixed chromites, wherein said thermally decomposable composition is heated progressively in said first step up to a temperature ranging from 350° C. to 400° C. at a rate of about 200–250° C. per hour, and wherein said thermically decomposable compositions are selected from the group consisting of:
$[E_vE'_{1-v} (Z)_m]Cr_2O_7$ where:
E and $E'=Mn^{2+}$, $Cd^{2+}$, $Zn^{2+}$, $Hg^{2+}$, or $Co^{2+}$, $0<v<1$, $E \neq E'$;
$Z=NH_3$, pyridine, ethylenediamine, or aniline; and $m=2, 3, 4$ or $6$.

10. A process according to claim 1 for preparing solid solutions of oxysulphides of U and Th, wherein said thermically decomposable composition is heated progressively in said first step up to a temperature in the range from 800° C. to 1000° C. at a rate of about 300° C. per hour, and wherein said thermically decomposable composition consists of a mixed oxalate having the formula:
$U_xTh_{1-x}(C_2O_4)_2 \cdot 6H_2O$, where $0<x<1$.

References Cited

Chevreton et al., Comptes rendu de l'Academie des Sciences de Paris 261 (1965), pp. 928–930.

Hahn et al., Zeitschrift fur anorganische und allgimeine Chemie, 288 (1956), pp. 269–278.

Tapluye et al., Bull. Soc. Chim. tr. (1963), pp. 1062–1066.

Delafosse et al., Comptes rendu de l'Academie des Sciences de Paris 254 (1962), pp. 1286–1288.

PATRICK P. GARVIN, Primary Examiner

U.S. Cl. X.R.

252—62.51; 106—55; 23—51, 56, 134, 345, 346